US006667360B1

(12) United States Patent
Ng et al.

(10) Patent No.: US 6,667,360 B1
(45) Date of Patent: Dec. 23, 2003

(54) NANOPARTICLE-FILLED POLYMERS

(75) Inventors: Chek Beng Ng, Albany, NY (US); Linda S. Schadler, Clifton Park, NY (US); Richard W. Siegel, Menands, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/329,697

(22) Filed: Jun. 10, 1999

(51) Int. Cl.$^7$ ................................. C08K 3/34
(52) U.S. Cl. ................... 524/492; 524/430; 524/493; 524/497
(58) Field of Search ................. 524/497, 492, 524/493, 430

(56) References Cited

U.S. PATENT DOCUMENTS

| | | | |
|---|---|---|---|
| 3,352,733 A | 11/1967 | Kruce | 156/94 |
| 3,390,035 A | 6/1968 | Sands | 156/72 |
| 3,537,946 A | 11/1970 | Truax et al. | 161/66 |
| 3,551,231 A | 12/1970 | Smedberg | 156/72 |
| 3,562,373 A | 2/1971 | Logrippo | 264/118 |
| 3,583,936 A | 6/1971 | Stahl | 260/28.5 |
| 3,620,860 A | 11/1971 | Eckardt et al. | 156/247 |
| 3,676,280 A | 7/1972 | Sands | 161/67 |
| 3,684,600 A | 8/1972 | Smedberg | 156/93 |
| 3,725,538 A | 4/1973 | Brewer | 423/449 |
| 3,857,799 A | 12/1974 | Ooba et al. | 260/2.3 |
| 3,923,653 A | 12/1975 | Lavins, Jr. | 210/71 |
| 3,928,051 A | 12/1975 | Brownlow et al. | 106/53 |
| 3,940,525 A | 2/1976 | Ballard | 428/96 |
| 3,941,066 A | 3/1976 | Itoh et al. | 110/18 R |
| 3,956,414 A | 5/1976 | Oshima | 260/683 R |
| 3,982,051 A | 9/1976 | Taft et al. | 427/207 |
| 4,020,020 A | 4/1977 | Appleyard et al. | 260/2.3 |
| 4,028,159 A | 6/1977 | Norris | 156/94 |
| 4,082,874 A | 4/1978 | Traylor, Jr. | 428/54 |
| 4,105,593 A | 8/1978 | Stavrinou | 260/2.3 |
| 4,158,646 A | 6/1979 | Benkowski et al. | 260/2.3 |
| 4,199,109 A | 4/1980 | Watanabe | 241/14 |
| 4,234,366 A | 11/1980 | Brewer et al. | 156/79 |
| 4,319,938 A | 3/1982 | Vives | 156/49 |
| RE31,826 E | 2/1985 | Machell | 428/92 |
| 4,522,857 A | 6/1985 | Higgins | 428/95 |
| 4,535,940 A | 8/1985 | Geng | 241/3 |
| 4,546,128 A | 10/1985 | Nakajima | 523/222 |
| 4,576,665 A | 3/1986 | Machell | 156/72 |
| 4,599,131 A | 7/1986 | Matuszak | 156/584 |
| 4,662,569 A | 5/1987 | Acker | 241/62 |
| 4,663,370 A | 5/1987 | Marvel, Sr. et al. | 523/221 |
| 4,715,920 A | 12/1987 | Ruppman et al. | 156/344 |
| 4,775,697 A | 10/1988 | Schoenhard | 521/48 |
| 4,808,482 A | 2/1989 | Benge et al. | 428/411.1 |
| 4,824,498 A | 4/1989 | Goodwin et al. | 156/71 |
| 4,844,765 A | 7/1989 | Reith | 156/306.6 |
| 4,875,954 A | 10/1989 | Griffiths et al. | 156/64 |
| 4,956,033 A | 9/1990 | Martin et al. | 156/94 |
| 5,061,735 A | 10/1991 | Zielinski | 521/46.5 |
| 5,076,870 A | 12/1991 | Sanborn | 156/73.1 |
| 5,080,291 A | 1/1992 | Bloom | 241/19 |
| 5,145,617 A | 9/1992 | Hermanson et al. | 264/37 |
| 5,169,870 A | 12/1992 | Corbin et al. | 521/49.8 |
| 5,169,876 A | 12/1992 | Heitmann et al. | 521/155 |
| 5,194,109 A | 3/1993 | Yamada | 156/94 |
| 5,221,395 A | 6/1993 | Luetkens, Jr. et al. | 156/244.11 |
| 5,230,473 A | 7/1993 | Hagguist et al. | 241/3 |
| 5,233,021 A | 8/1993 | Sikorski | 528/491 |
| 5,240,530 A | 8/1993 | Fink | 156/94 |
| 5,244,971 A | 9/1993 | Jean-Marc | 525/64 |
| 5,244,973 A | 9/1993 | Sakazume et al. | 525/66 |
| 5,294,384 A | 3/1994 | David et al. | 264/37 |
| 5,375,778 A | 12/1994 | Lundquist | 241/24 |
| 5,518,188 A | 5/1996 | Sharer | 241/14 |
| 5,535,945 A | 7/1996 | Sferrazza et al. | 241/24.12 |
| 5,719,198 A | 2/1998 | Young et al. | 521/40.5 |
| 5,852,115 A | 12/1998 | Young et al. | 525/64 |
| 5,859,071 A | 1/1999 | Young et al. | 521/40.5 |
| 5,965,267 A | * 10/1999 | Nolan et al. | 428/408 |
| 6,020,419 A | * 2/2000 | Bock et al. | 524/590 |

FOREIGN PATENT DOCUMENTS

| | | |
|---|---|---|
| DE | 24 25 751 | 12/1975 |
| DE | 38 16 894 | 11/1989 |
| GB | 971958 | 10/1964 |
| JP | 54-117579 | 9/1979 |
| JP | 58-119821 | 7/1983 |
| JP | 60-185823 | 9/1985 |
| JP | 60-206868 | 10/1985 |
| JP | 60-219016 | 11/1985 |
| JP | 63-057355 | 3/1988 |

OTHER PUBLICATIONS

Malloy, R., et al., *Reclamation of Automotive Carpet Scrap*, AIChE Spring National Meeting, Mar. 29, 1992.

Ryburn Foam, Ltd., *Method of Reclamation of Carpet, Slipper and Other Mixed Textile Waste*, RD 19524, Jul. 10, 1980.

Sadrmohaghegh, C., et al., *Recycling of Mixed Plastics*, Polym. Plast. Technol. Eng., 24(2&3), pp 149–185, 1985.

Soviet Technology Alert, *Carpets From Plastic Waste*, Elsevier Advanced Technology Publications, vol. 1, No. 3, Mar., 1988.

United Recycling, Inc., *Carpet Recycling Is Here!*, Midwest Retailer, vol. 21, No. 7, p. 1, Jul., 1992.

Wagner, R.H., *A New Technology for Recycling Carpet Waste*, Translated from Chemiefasern/Textilindustrie, vol. 28/80, pp. 644–648, Jul., 1978.

Watzl, A., *Recycling to Textile Waste into Nonwovens Products*, Translation of Melliand Textilberichte, 73, p. 397, May, 1992.

\* cited by examiner

Primary Examiner—Edward J. Cain
(74) Attorney, Agent, or Firm—Heslin Rothenberg Farley & Mesiti P.C.; Mary Louise Gioeni

(57) ABSTRACT

Polymer resins incorporating nanoparticles having a particle size in the range of 1–100 nm and a narrow particle size distribution have improved tensile properties and scratch resistance.

17 Claims, 4 Drawing Sheets

100 μ

100 μ

100 μ

NANOPARTICLE-FILLED POLYMERS

FIELD OF THE INVENTION

The invention relates to polymer resins incorporating filler materials of particle size 1–100 nm and having a narrow particle size distribution.

BACKGROUND OF THE INVENTION

It is well known that the presence of fillers in a polymer resin can improve mechanical and chemical properties of the resin. For example, Moloney et al. (*Journal of Materials Science*, 1987, 22, 381) reported that, in epoxy systems, by increasing the volume fraction of fillers and by using higher modulus fillers, such as micron-size silica, alumina, and silicon carbide, the modulus of the composites was also increased. Filled or reinforced polymers have been used for many years in applications as varied as synthetic rubbers, epoxy-fiberglass composites, and paints.

However, despite the advantages of using filled polymers in such application, in many cases, the properties fall short of the ideal. For example, articles fabricated from or coated with polymers, filled or unfilled, are easily scratched. Plastics used in optical applications such as eyeglass lenses are typically coated to improve scratch resistance, yet resistance to scratching remains less than desired. A second example is magnetic tape, which is also susceptible to scratching, leading to a loss in quality. In addition, conventional fillers can embrittle polymers.

Therefore, there is a continuing need for polymers with improved properties, including scratch resistance. There is also a need for polymers having increased modulus while maintaining good ductility. There is a further need for polymers having improved dimensional stability.

SUMMARY OF THE INVENTION

It has been unexpectedly discovered that incorporation of a filler of very small particle size with a narrow particle size distribution results in a polymer having improved mechanical properties, including increased toughness and scratch resistance and improved dimensional stability.

In one aspect, the present invention relates to a polymer nanocomposite comprising about 50–99 weight % polymer resin and about 1–50 weight % nanoparticles having particle size from about 1 nm to less than about 100 nm, and a narrow particle size distribution. The polymer resin is preferably an epoxy, polycarbonate, silicone, polyester, polyether, polyolefin, synthetic rubber, polyurethane, nylon, polystyrene, polyphenylene oxide, and polyketone or a copolymer or blend thereof. More preferably, the polymer resin is an epoxy. Even more preferably, the epoxy is a diglycidyl ether of bisphenol A. The nanoparticles are preferably metal nanoparticles, metal oxide nanoparticles, metal nitride nanoparticles, metal carbide nanoparticles, metal sulfide nanoparticles, metal fluoride nanoparticles, and metal chloride nanoparticles, more preferably, metal oxide nanoparticles, and even more preferably, titanium dioxide nanoparticles. Preferably, the particle size of the nanoparticles ranges from about 1 nm to about less than 50 nm. Preferably, the polymer nanocomposite comprises about 70–5 weight % polymer resin and about 5–30 weight % nanoparticles having particle size from about 1 nm to less than about 100 nm, and a narrow particle size distribution.

In another aspect, the present invention relates to an epoxy nanocomposite having improved mechanical properties comprising 50–99 weight % epoxy resin and 1–50 weight % quasi-spherical particles having particle size from about 1 nm to less than about 100 nm and a narrow particle size distribution.

In yet another aspect, the invention relates to a scratch-resistant coating comprising about 50–99 weight % polymer resin and about 1–50 weight % nanoparticles having particle size from about 1 nm to less than about 100 nm, and a narrow particle size distribution. In a preferred embodiment, the scratch-resistant coating comprises about 85–95 weight % polymer resin and about 5–15 weight % nanoparticles.

In yet another aspect, the invention relates to a polymer nanocomposite stamp comprising about 50–99 weight % polymer resin and about 1–50 weight % nanoparticles having particle size from about 1 nm to less than about 100 nm, and a narrow particle size distribution. In a preferred embodiment, the polymer nanocomposite stamp comprises about 85–95 weight % polymer resin and about 5–15 weight % nanoparticles.

DETAILED DESCRIPTION OF THE INVENTION

Figure 1:
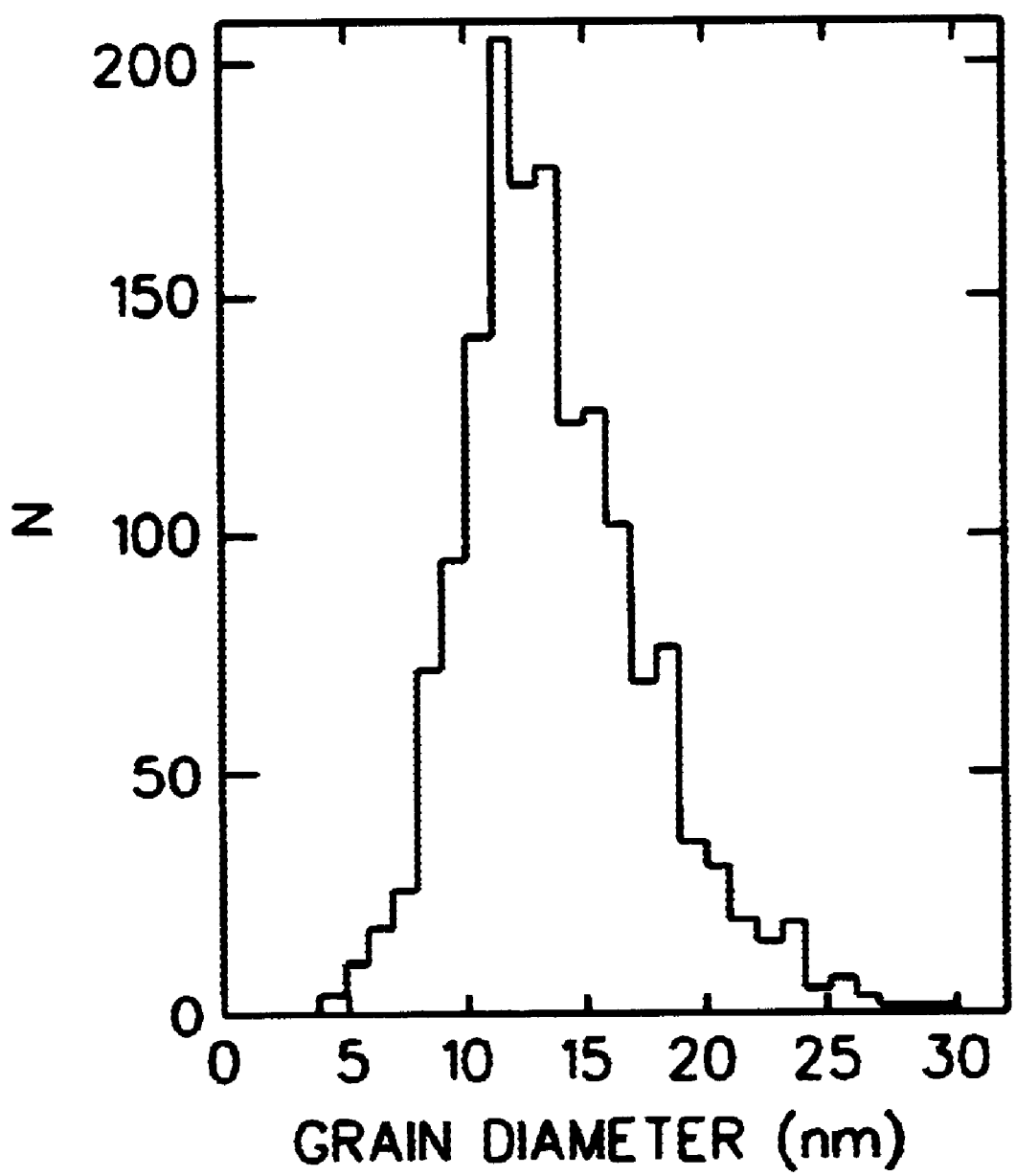
FIG. 1 shows particle size distribution for $TiO_2$ nanoparticles useful in the present invention, as determined by transmission electron microscopy.

The polymer resins used in the present invention include epoxy, polycarbonate, silicone, polyester, polyether, polyolefin, synthetic rubber, polyurethane, nylon, and polystyrene, and polyvinylaromatic, acrylic, polyamide, polyimide, phenolic, polyvinylhalide, polyphenylene oxide, and polyketone and copolymers and blends thereof. Copolymers include both random and block copolymers. Polyolefin resins include polybutylene, polypropylene and polyethylene, such as low density polyethylene, medium density polyethylene, high density polyethylene, and ethylene copolymers; polyvinylhalide resins include polyvinyl chloride polymers and copolymers and polyvinylidene chloride polymers and copolymers, fluoropolymers; polyvinylaromatic resins include polystyrene polymers and copolymers and poly α-methylstyrene polymers and copolymers; acrylate resins include polymers and copolymers of acrylate and methacrylate esters, polyamide resins include nylon 6, nylon 11, and nylon 12, as well as polyamide copolymers and blends thereof, polyester resins include polyalkylene terephthalates, such as polyethylene terephthalate and polybutylene terephthalate, as well as polyester copolymers; synthetic rubbers include styrene-butadiene and acrylonitrile-butadiene-styrene copolymers and; polyketones include polyetherketones and polyetheretherketones.

A variety of diluents and additives which are well known to those skilled in the art are typically admixed with the polymer resins including water, oils, coupling agents, diluents and dispersants.

In a preferred embodiment, the polymer resin is an epoxy resin. Any conventionally used epoxy resin may be used in the present invention. Examples of suitable epoxy resins include glycidyl ethers such as bisphenol-A-diglycidyl ether (DGEBA), glycidyl ethers of bisphenol S and bisphenol F, butanediol diglycidyl ether, bisphenol-A-extended glycidyl ethers, phenol-formaldehyde glycidyl ethers (epoxy novolacs), and cresol-formaldehyde glycidyl ethers (epoxy cresol novolacs); expoxidized alkenes such as 1,2-epoxyoctane, 1,2-epoxydecane, 1,2,13,14-tetradecane diepoxide, 1,2,7,8-octane diepoxide; epichlorohydrin; cycloaliphatic epoxides such as limonene dioxide, α-pinene oxide, dicyclopentadiene dioxide, 4-vinylcyclohexene dioxide, 3,4-epoxycyclohexylmethyl-3',4'-epoxycyclohexene carboxylate, cyclohexene oxide, cyclopentene oxide, cycloheptene oxide, cyclooctene oxide, 1,2, 5,6-cyclooctadiene dioxide; glycidyl ethers such as diglycidyl phthalate; epoxidized vegetable oils such as epoxidized linseed, soybean, safflower, sunflower, rapeseed, canola oil; silicone epoxy resins; epoxidized polymers such as epoxidized polybutadiene, epoxidized polyisoprene and epoxidized polystyrene-co-butadiene; glycidyl ester epoxy resins, glycidyl amino epoxy resins, linear aliphatic epoxy resins, heterocyclic epoxy resins halogentated epoxy resins and liquid crystalline epoxies. These epoxy resins may be used singly or as a mixture of two or more. A preferred epoxy-functional monomer is DGEBA.

The nanoparticle-filled epoxy resins for use in the present invention may be cured by heating, using conventional curing agents. Illustrative of suitable curing agents are aromatic amines, acid anhydrides, dicyandiamide, and imidazole compounds.

The resins may also be cured using radiation, including UV or visible light, e-beam or x-ray irradiation. Exemplary initiators or curing agents which may be used to initiate photopolymerization are diaryliodonium salts, triarylsulfonium salts, diaryliodosonium salts, dialkylphenylsulfonium salts, dialkyl(hydroxydialkylphenyl)sulfonium salts and ferrocenium salts. Typically, the photoinitiator is employed in concentrations ranging from 0.1 to 10% by weight based on the monomer or monomers.

The polymer resin may be in the form of a neat resin, a dispersion in water or organic solvent, or a solution in an organic solvent.

Nanoparticles for use in the present invention are typically manufactured by a gas condensation process, such as that described in U.S. Pat. Nos. 5,128,081 and 5,320,800, the contents of which are incorporated herein by reference. A gas condensation process for the preparation of nanoparticles typically involves evaporation of a metal precursor material from which the nanoparticles will be synthesized at gas pressures of less than one or equal to one atmosphere. The evaporated metal condenses into small particles in the gas atmosphere and the resulting nanoparticles are collected on a surface within the reactor. Any metal or metal compound capable of being volatilized may be used to form the nanoparticles for use in the present invention. Exemplary metals are titanium, copper, silver, gold, platinum, and palladium. The metal nanoparticles may be further subjected to a reactive gas atmosphere to form oxides, nitrides, carbides, sulfides, fluorides, and chlorides. Exemplary metal oxide nanoparticles are those composed of aluminum oxide, antimony tin oxide, cerium oxide, copper oxide, indium oxide, indium tin oxide, iron oxide, silicon dioxide, tin oxide, titanium dioxide, yttrium oxide, zinc oxide, barium oxide, calcium oxide, chromium oxide, magnesium oxide, manganese oxide, molybdenum oxide, neodymium oxide, and strontium oxide. Metal titanate and metal silicate nanoparticles including, for example, strontium titanate, barium titanate, barium strontium titanate, and zirconium silicate may also be used. Titanium dioxide nanoparticles are preferred for use as polymer fillers. Titanium dioxide nanoparticles of varying particle size, synthesized by a gas condensation process, are commercially available from Nanophase Technologies Corporation. Nanophase Technologies also manufactures the metal, metal oxide, metal titanate and metal silicate nanoparticles listed above. Carbon particles may also be used in the practice of the invention.

Nanoparticles utilized in the present invention have a particle size ranging from about 1 nm to about 100 nm, preferably from about 10 nm to about 50 nm. The size distribution of the nanoparticles is narrow. A narrow particle size distribution is defined as one in which greater than 90% of the particles have a particle size in the range of 0.2–2 times the mean particle size. Preferably, greater than 95% of the particles have a particle size in this range, and more preferably greater than 99%.

In the nanoparticle industry, it is customary to define a particle size distribution in terms of the mean particle size and the width of the distribution. The width of the distribution curve at one half of the maximum value is termed full width half max (FWHM). The relationship between the FWHM and mean particle size is used as a measure of broadness or narrowness of the distribution. For example, a distribution having a FWHM value that is greater than the mean particle size is considered relatively broad. As discussed above, the nanoparticles used in the present invention have a narrow particle size distribution. An alternative definition of narrow particle size distribution for the nanoparticles used in the present invention is a distribution in which the FWHM of the distribution curve is equal to the difference between the mean particle size plus 40% of the mean and the mean minus 40% of the mean. (This may be simplified to two times 40% of the mean, or 80% of the mean. Using this simplified formula, the FWHM is less than or equal to 80% of the mean.) Preferably, the FWHM is less than or equal to the difference between the mean plus 30% and the mean minus 30% (60% of the mean.) More preferably, the FWHM is less than or equal to the difference between the mean plus 20% and the mean minus 20% (40% of the mean.)

FIG. 1 is a graph showing the narrow particle size distribution of an exemplary sample of $TiO_2$ nanoparticles. On the graph, the number of particles having a particular size is plotted against that particle size. The mean particle size of the sample is about 12 nm; greater than 99% of the particles have a particle size in the range of 2.4 nm–24 nm. The maximum number of particles shown on the graph is about 200, at 12 nm; half max, then, is about 100. The lower limit of the curve at half max is about 10 nm, the upper limit at half max is about 17.5, and the difference between the two is equal to a value of about 7.5 for FWHM. For this exemplary distribution, then, the mean plus 30% minus the mean minus 30% (15.6−8.4=7.2) is about equal to the FWHM of about 7.5 nm.

Nanoparticles useful in the present invention are typically equiaxed, such that their shape is quasi-spherical. The long axis of a particle is defined as the longest axis through a particle, and the short axis means the shortest axis through a particle. The long axis of the nanoparticles for use in the present invention is approximately equal to the short axis, resulting in a particle shape which is quasi-spherical. For at least 90% of the nanoparticles, the ratio of the length of the short axis to that of the long axis is at least 0.1, preferably 0.4, and more preferably 0.8.

Further, the surface of a nanoparticle utilized in the present invention is typically chemically clean, being composed essentially of pure metal, or metal oxide, sulfide, nitride, carbide, fluoride, or chloride. Nanoparticles made by wet chemical methods are often contaminated by residues from chemicals used in the process. Likewise, typical processes for the production of titanium dioxide particles involve the oxidation of $TiCl_4$ to $TiO_2$. The surface of particles produced by this process contains residual chloride ions from the $TiCl_4$. Nanoparticles produced by a gas condensation process are not contaminated by process residues, because no solvents, reagents or intermediates are used. Therefore, nanoparticles for use in the present invention are preferably prepared by a gas condensation process, as described above.

Nanoparticles used in the present invention are crystalline materials, and are referred to as nanocrystalline. Each of these particles is composed of a single grain, that is, a single crystal consisting of atoms arranged in an orderly pattern. Nanocrystalline materials have grains containing thousands to tens-of thousands of atoms as compared to millions or trillions of atoms in the grains of conventional particles, and have a significantly higher percentage of atoms present on the surface of the particle.

The present invention is particularly useful as a scratch-resistant coating or part, and in electronic applications as a polymer nanocomposite stamp.

EXAMPLES

Mechanical and thermal properties of cured epoxy resins filled with a $TiO_2$ nanoparticle filler at the 10% level (weight on total weight) were determined and compared to those for pure epoxy resins and for epoxies filled with $TiO_2$ of micron dimensions.

Sample Preparation

Titanium dioxide particles of two different particle sizes, 10% by weight, were added at 60° C. to a commercial grade diglycidyl ether of bisphenol A from Shell Oil Company. Nanometer-size $TiO_2$ particles (32 nm) of composition 90% anastase and 10% rutile were obtained from Nanophase Technologies Corporation. Micron-size $TiO_2$ (0.24 μm, Tioxide Inc.) was chosen to match the surface chemistry and crystallographic composition of the nanometer-size $TiO_2$ as closely as possible. The $TiO_2$ fillers were dispersed in the epoxy by placing the mixture in an ultrasonic bath at 60° C. for about one hour. Hardener 1,3-phenyenediamine was melted and added to the epoxy/filler mix at ratio of 14.5 g per 100 g epoxy. The mixture was poured into a preheated silicone mold and cured at 75° C. for 2.5 hours and then at 120° C. for 2.5 hours.

Example 1

Resistance to elastic and plastic deformation during abrasion was determined by scratch testing. Specimens of dimensions 2 cm×1 cm×0.5 cm were polished using a 400 grit paper prior to testing. Scratch testing was performed with a BYK Gardener SG-8101 balance beam scrape adhesion tester with a 4 kg load. Fracture and scratch morphology were observed using a JOEL-JSM 840 scanning electron microscope.

Results appear in Table 1. The nanoparticle-filled epoxy has the lowest scratch depth, followed by the unfilled epoxy and then the microparticle-filled epoxy.

Micrographs of exemplary scratch specimens are shown in FIGS. 2–7. The figures illustrate that the scratch profile for the epoxy containing micron-size particles showed greater deformation with more damage than the unfilled epoxy, while the nanoparticle-filled epoxy showed a 35% improvement in scratch resistance with the least plastic deformation and damage.

Figure 2:
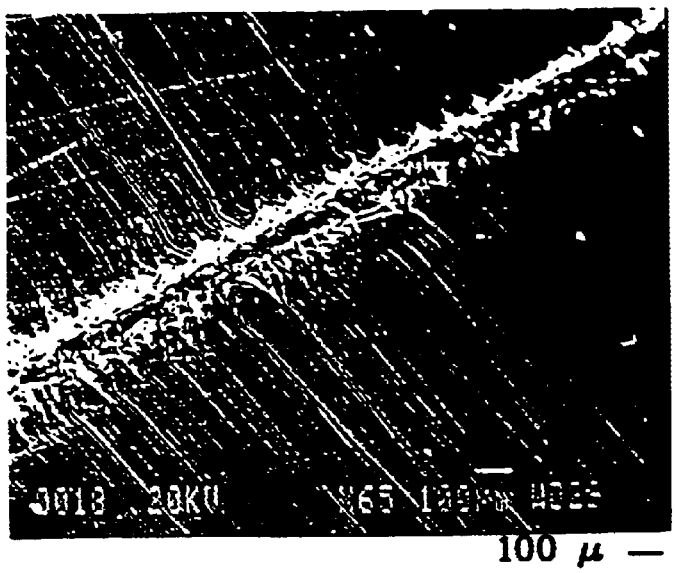
FIG. 2 is a scanning electron micrograph showing the scratch morphology of an unfilled epoxy.
Figure 3:
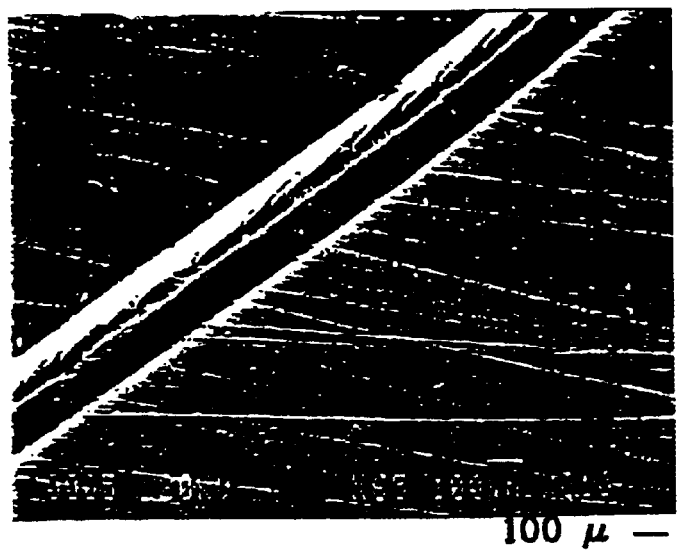
FIG. 3 is a scanning electron micrograph showing the scratch morphology of a microparticle-filled epoxy.
Figure 4:
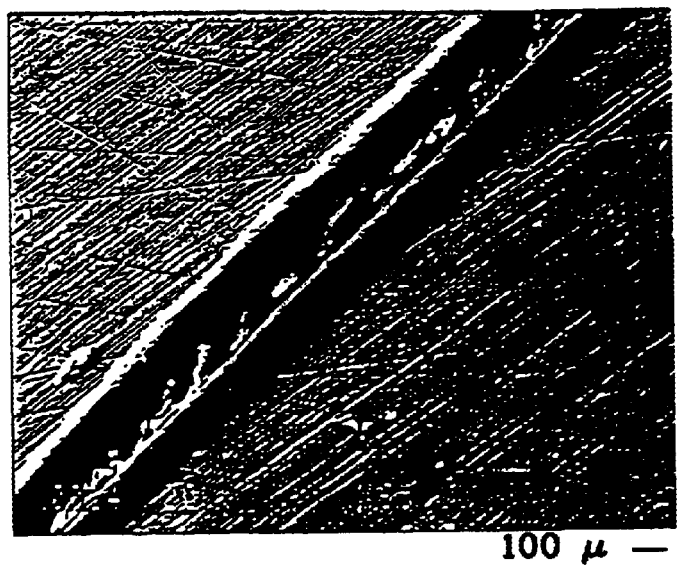
FIG. 4 is a scanning electron micrograph showing the scratch morphology of a nanoparticle-filled epoxy.
Figure 5:
FIG. 5 is a scanning electron micrograph showing a close-up of the scratch morphology of an unfilled epoxy.
Figure 6:
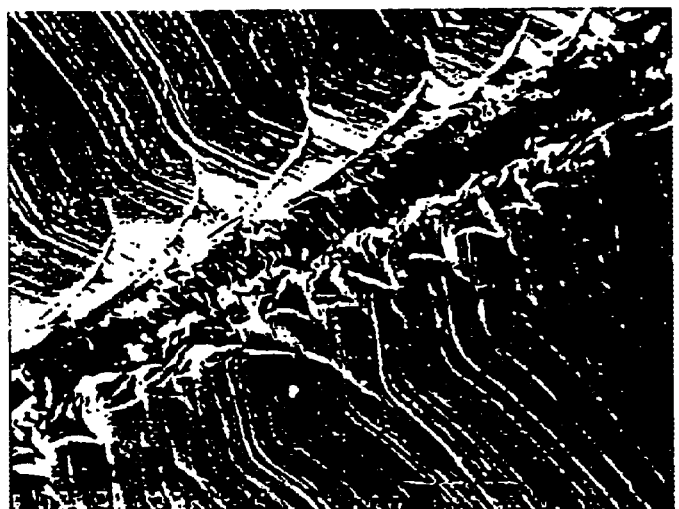
FIG. 6 is a scanning electron micrograph showing a close-up of the scratch morphology of a microparticle-filled epoxy.
Figure 7:
FIG. 7 is a scanning electron micrograph showing a close-up of the scratch morphology of a nanoparticle-filled epoxy.

In FIG. 2, unfilled epoxy, the scratch shows some chip-off from the sides, and crack lines originating from the jagged edges. In FIG. 3, microparticle-filled epoxy, there is some particle pull-out from the groove, as well as extensive damage on either side of the track and a higher elevation on both sides of the track compared to the unfilled epoxy. In FIG. 4, nanoparticle-filled epoxy, the track is smooth, ridges beside the groove are less elevated, and there are no visible crack lines along the edges of the scratch.

TABLE 1

| Property Measured | Pure epoxy | Microparticle-filled Epoxy, 10% | Nanoparticle-filled Epoxy, 10% |
| --- | --- | --- | --- |
| Average Scratch Depth | 43.9 μm | 46 μm | 27.7 μm |
| Young's Modulus | 3.00 ± 0.13 GPa | 3.32 ± 0.25 GPa | 3.30 ± 0.16 GPa |
| Rupture Stress | 89.3 ± 6.5 MPa | 85.3 ± 17.6 MPa | 82.1 ± 12.6 MPa |
| Strain-to-Failure | 4.87% ± 0.94 | 4.10% ± 1.55 | 5.62% ± 0.87 |

Example 2

Tensile testing was performed on an Instron Model 4204 at a stroke rate of 2.54 mm/min at room temperature. The gauge length of the tensile specimens was about 5 cm with a cross sectional area of about 11 mm$^2$. All samples were polished using a 400 grit paper prior to testing. Strain-to-failure, rupture stress and the 1% secant modulus were calculated.

Results above appear in Table 1. All of the samples showed approximately the same elastic modulus and rupture stress. However, the maximum strain-to-failure for the nanoparticle-filled epoxy was about 20% higher than that for the pure epoxy. The combination of strength, modulus and ductility gives greater toughness compared to the unfilled epoxy and the microparticle-filled epoxy.

Example 3

Swelling behavior was determined in boiling water. Cubes 5 mm$^3$ were held in boiling water for five days. The samples were weighed and dimensions of the cube measured periodically, and weight percent and volume percent change was calculated.

Figure 8:
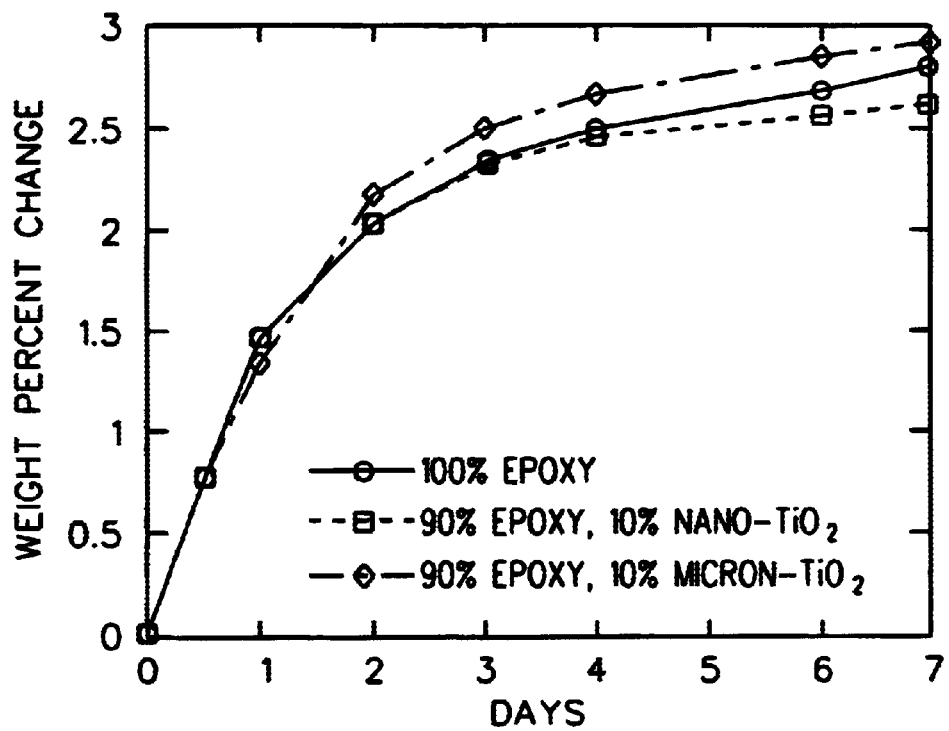
FIG. 8 is a graph of weight percent change over time for unfilled epoxy, microparticle-filled epoxy, and nanoparticle-filled epoxy samples in boiling water.
Figure 9:
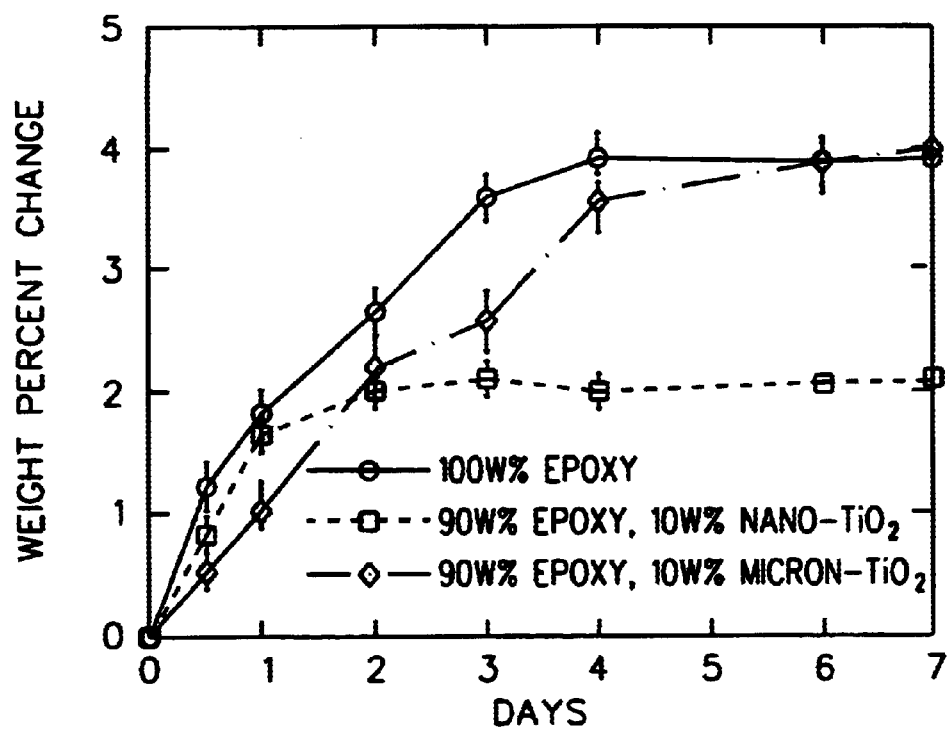
FIG. 9 is a graph of volume percent change over time for unfilled epoxy, microparticle-filled epoxy, and nanoparticle-filled epoxy samples in boiling water.

FIGS. 8 and 9 show swelling results. Weight percent change for the filled and unfilled epoxies was about equal. However, there were significant differences in the volume percent change for the samples. The dimensional stability of the nanoparticle-filled epoxy was highest.

What is claimed is:

1. A polymer nanocomposite comprising:
   a. about 50–99 weight % polymer resin and
   b. about 1–50 weight % crystalline nanoparticles having particle size from about 1 nm to less than about 100 nm; a narrow particle size distribution and a chemically clean surface,
      said nanoparticles consisting of one or more metals, one or more metal oxides, one or more metal nitrides, one or more metal carbides, one or more metal sulfides, one or more metal fluorides, one or more metal chlorides, or a mixture thereof.

2. A polymer nanocomposite according to claim 1, wherein the polymer resin is chosen from the group consisting of: epoxy, polycarbonate, silicone, polyester, polyether, polyolefin, synthetic rubber, polyurethane, nylon, polystyrene, polyphenylene oxide, and polyketone and copolymers and blends thereof.

3. A polymer nanocomposite according to claim 2, wherein the polymer resin is an epoxy.

4. A polymer nanocomposite according to claim 3, wherein the epoxy is a diglycidyl ether of bisphenol A.

5. A polymer nanocomposite according to claim 1, wherein the nanoparticles are metal oxide nanoparticles.

6. A polymer nanocomposite according to claim 5, wherein the nanoparticles are titanium dioxide nanoparticles.

7. A polymer nanocomposite according to claim 1, wherein the particle size of the nanoparticles ranges from about 1 nm to about less than 50 nm.

8. A polymer nanocomposite according to claim 1, comprising
   a. about 70–95 weight % polymer resin and
   b. about 5–30 weight % nanoparticles having particle size from about 1 nm to less than about 100 nm, and a narrow particle size distribution.

9. An epoxy nanocomposite comprising:
   a. 50–99 weight % epoxy resin and
   b. 1–50 weight % crystalline, quasi-spherical particles having particle size from about 1 nm to less than about 100 nm, and a narrow particle size distribution, and a chemically clean surface.

10. An epoxy nanocomposite according to claim 9, comprising:
    a. 85–95 weight % epoxy resin and
    b. 5–15 weight % said crystalline quasi-spherical particles.

11. A polymer An epoxy nanocomposite according to claim 1, comprising:
    a. about 85–95 weight % polymer resin and
    b. about 5–15 weight % said nanoparticles.

12. A polymer nanocomposite comprising:
    a. about 50–99 weight % polymer resin and
    b. about 1–50 weight % crystalline nanoparticles
       wherein said nanoparticles have a particle size ranging from about 1 nm to less than about 100 nm and a narrow particle size distribution;
       are composed of one or more metals, one or more metal oxides, one or more metal nitrides, one or more metal carbides, one or more metal sulfides, one or more metal fluorides, one or more metal chlorides, or a mixture thereof; and
       are synthesized by a gas condensation process.

13. A polymer nanocomposite according to claim 12, wherein the polymer resin is chosen from the group consisting of epoxy, polycarbonate, silicone, polyester, polyether, polyolefin, synthetic rubber, polyurethane, nylon, polystyrene, polyphenylene oxide, and polyketone and copolymers and blends thereof.

14. A polymer nanocomposite according to claim 12, wherein the polymer resin is an epoxy.

15. A polymer nanocomposite according to claim 14, wherein the epoxy is a diglycidyl ether of bisphenol A.

16. A polymer nanocomposite according to claim 12, wherein the nanoparticles are metal oxide nanoparticles.

17. A polymer nanocomposite according to claim 12, wherein the nanoparticles are titanium dioxide nanoparticles.

* * * * *

UNITED STATES PATENT AND TRADEMARK OFFICE
CERTIFICATE OF CORRECTION

PATENT NO. : 6,667,360 B1
DATED : December 23, 2003
INVENTOR(S) : Ng et al.

It is certified that error appears in the above-identified patent and that said Letters Patent is hereby corrected as shown below:

Column 8,
Line 5, delete the word "distribution" in the first instance
Line 12, delete the words "An epoxy"
Line 31, insert -- : -- after the word "of"

Signed and Sealed this

Fourth Day of May, 2004

JON W. DUDAS
*Acting Director of the United States Patent and Trademark Office*